United States Patent
Mitchell et al.

(10) Patent No.: US 9,825,975 B2
(45) Date of Patent: Nov. 21, 2017

(54) AERONAUTICAL MESSAGE MONITOR

(71) Applicant: The Boeing Company, Chicago, IL (US)

(72) Inventors: Timothy M. Mitchell, Seattle, WA (US); Jason W. Shelton, Edgewood, WA (US); Daniel Nguyen, Auburn, WA (US)

(73) Assignee: THE BOEING COMPANY, Chicago, IL (US)

(*) Notice: Subject to any disclaimer, the term of this patent is extended or adjusted under 35 U.S.C. 154(b) by 174 days.

(21) Appl. No.: 14/829,093

(22) Filed: Aug. 18, 2015

(65) Prior Publication Data

US 2017/0054740 A1    Feb. 23, 2017

(51) Int. Cl.
| | | |
|---|---|---|
| *H04L 29/06* | (2006.01) | |
| *H04B 7/185* | (2006.01) | |
| *H04L 1/20* | (2006.01) | |
| *H04L 29/08* | (2006.01) | |
| *H04L 12/26* | (2006.01) | |
| *H04L 12/58* | (2006.01) | |

(52) U.S. Cl.
CPC ..... *H04L 63/1416* (2013.01); *H04B 7/18506* (2013.01); *H04L 1/201* (2013.01); *H04L 43/16* (2013.01); *H04L 51/046* (2013.01); *H04L 51/18* (2013.01); *H04L 63/123* (2013.01); *H04L 63/1425* (2013.01); *H04L 67/12* (2013.01)

(58) Field of Classification Search
CPC ..... H04L 63/1416; H04L 1/201; H04L 67/12; H04L 63/123; H04L 63/1425; H04L 43/16; H04L 51/18; H04L 51/046; H04B 7/18506
See application file for complete search history.

(56) References Cited

U.S. PATENT DOCUMENTS

| | | | | |
|---|---|---|---|---|
| 5,528,244 A | * | 6/1996 | Schwab | G01S 7/42 342/30 |
| 5,717,830 A | * | 2/1998 | Sigler | H04B 7/18578 370/327 |
| 6,058,307 A | * | 5/2000 | Garner | H04B 7/18539 455/12.1 |
| 6,112,083 A | * | 8/2000 | Sweet | H04B 7/18545 379/203.01 |

(Continued)

OTHER PUBLICATIONS

Extended European Search Report for EP Appl. No. 16182342 dated Jan. 16, 2017.

*Primary Examiner* — Frederick Brushaber
(74) *Attorney, Agent, or Firm* — MH2 Technology Law Group LLP

(57) ABSTRACT

A system includes a transmitting line replaceable unit (TLRU) configured to receive messages including instructions for avionics receiving line replaceable units (RLRUs). The system further includes a memory configured to store validation data including a set of expected messages. A monitor is further included and is configured to monitor messages received at the TLRU and further configured to determine whether received messages are valid based on at least a portion of the set of expected messages stored in the memory. A plurality of RLRUs are further included and configured to receive message from the TLRU and to execute the instructions included in the received messages.

18 Claims, 8 Drawing Sheets

(56) References Cited

U.S. PATENT DOCUMENTS

| | | | | |
|---|---|---|---|---|
| 6,112,085 A * | 8/2000 | Garner | | H04B 7/18539 455/428 |
| 6,477,370 B1 * | 11/2002 | Sigler | | H04B 7/18539 455/427 |
| 6,850,497 B1 * | 2/2005 | Sigler | | H04B 7/1853 370/310 |
| 7,721,149 B2 * | 5/2010 | Essame | | G06F 11/0796 714/11 |
| 8,497,803 B1 * | 7/2013 | Baker | | G08G 5/0026 342/454 |
| 8,737,426 B1 * | 5/2014 | Fredriksson | | H04J 3/0602 370/464 |
| 2005/0024186 A1 * | 2/2005 | Friedrich | | G06K 7/0008 340/10.31 |
| 2010/0072932 A1 * | 3/2010 | Seger | | H02P 6/14 318/490 |
| 2010/0100959 A1 * | 4/2010 | Mahaffey | | H04L 63/1408 726/22 |
| 2011/0246780 A1 * | 10/2011 | Yeap | | G06Q 20/02 713/176 |
| 2011/0296435 A1 * | 12/2011 | Simsek | | G06F 9/546 719/313 |
| 2014/0013431 A1 * | 1/2014 | Bush | | G06F 21/00 726/23 |
| 2014/0280636 A1 * | 9/2014 | Fredriksson | | H04L 29/0619 709/206 |
| 2014/0328357 A1 * | 11/2014 | Fredriksson | | H04J 3/0614 370/520 |
| 2014/0334314 A1 * | 11/2014 | Fredriksson | | H04J 3/07 370/242 |
| 2015/0113638 A1 * | 4/2015 | Valasek | | H04L 63/1441 726/22 |
| 2015/0261666 A1 * | 9/2015 | Mergener | | H04L 69/03 711/154 |
| 2015/0295910 A1 * | 10/2015 | Nairn | | H04L 63/08 726/7 |

* cited by examiner

AERONAUTICAL MESSAGE MONITOR

TECHNICAL FIELD

The present teachings relate to the field of monitoring messages and/or providing information and, more particularly, to monitoring aeronautical messages and/or providing alerts based on the monitoring of aeronautical messages.

BACKGROUND

Typical aircraft utilize line replaceable units (LRUs) in order to receive and execute instructions for operating components of an aircraft. Communication between the LRUs usually takes place via a secure, serial-based protocol that was generally secure against cyber attacks. More recently, the systems in aircraft have been expanded to allow the LRUs to communicate via other communication protocols including Ethernet. This has provided an opportunity for hackers to infiltrate an aircraft's computing system.

Therefore there is a need to provide security in aeronautical computing systems and to provide alerts when a threat is found.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

According to the present teachings, a system of the present disclosure may include a transmitting line replaceable unit (TLRU) configured to receive messages including instructions for avionics receiving line replaceable units (RLRUs); a memory configured to store validation data including a set of expected messages; and a monitor configured to monitor messages received at the TLRU and further configured to determine whether received messages are valid based on at least a portion of the set of expected messages stored in the memory.

The monitor may be further configured to compare a first portion of a message received at the TLRU with a corresponding portion of an expected message in the set of expected messages; and determine whether the received message is valid based on the comparing of the first portion of the message with the corresponding portion of the expected message.

When comparing the message received at the TLRU, a bit-by-bit comparison of the first portion of the received message with the corresponding portion of the expected message may be performed. When the bit-by-bit comparison results in at least one non-match of compared bits, then for each non-match, a counter may be updated. A counter value may be compared with a plurality of predetermined threshold values. When the counter value meets or exceeds at least one of the predetermined threshold values, then it may be determined that the received message is not a valid message.

Optionally, the system may include an alerter. The monitor may be further configured to instruct the alerter to issue an alert when it is determined that the counter value exceeds at least one of the plurality of predetermined threshold values.

Optionally, the alerter may illuminate a border of a flight deck instrument on a display panel when the counter value exceeds a first threshold of the plurality of threshold values.

Optionally, the border of the flight deck instrument is displayed in one of a plurality of colors based on the one of the plurality of threshold values that was met or exceeded thereby indicating a threat level.

Optionally, the alerter may illuminate a light on a display when the counter value exceeds a second threshold of the plurality of threshold values.

Optionally, the memory may be further configured to store flight phase information in association with a respective label code in the memory. The monitor may be further configured to determine a current flight phase, determine a label code in a received message, compare the label code of the received message with a label code corresponding to the current flight phase, and determine that the received message is valid when the label code of the received message matches the label code corresponding to the current flight phase.

Optionally, the received messages are Aeronautical Radio Inc. (ARINC) messages.

Optionally, the monitor may be further configured to determine whether a core file associated with the received message has been altered based on at least one of a date indicating the last time the core file was written to, a date indicating when the core file was last modified, and an update schedule of the core file.

Optionally, the system may further include a plurality of receiving line replaceable units (RLRUs) configured to receive messages from the TLRU that were received at the TLRU and to execute the instructions included in the received messages.

Optionally, a method is provided that includes accessing a message that was received at a transmitting line replaceable unit (TLRU); comparing a first portion of the received message with a corresponding portion of an expected message; and determining whether the received message is valid based on the comparing of the first portion of the received message with the corresponding portion of the expected message.

Comparing the message received at the TLRU may include performing a bit-by-bit comparison of the first portion of the received message with the corresponding portion of the expected message; when a bit-by-bit comparison results in at least one non-match of respective bits, for each non-match, updating a counter; comparing a value of the counter with a plurality of predetermined threshold values; and when the counter value meets or exceeds at least one of the predetermined threshold values, determining that the received message is not a valid message.

Optionally, the method may further include instructing an alerter to issue an alert when it is determined that the counter value exceeds at least one of the plurality of predetermined threshold values.

Optionally, the alerter may illuminate a border of a flight deck instrument on a display panel when the counter value exceeds a first threshold of the plurality of threshold values.

Optionally, the border of the flight deck instrument may be displayed one of a plurality of colors based on the one of the plurality of threshold values that was met or exceeded indicating a threat level.

Optionally, the alerter may illuminate a light on a display when the counter value exceeds a second threshold of the plurality of threshold values.

Optionally, the method may further include storing flight phase information in association with a respective label code in a memory; determining a current flight phase; determining a label code in a received message; comparing the label code of the received message with a label code corresponding to the current flight phase; and determining whether the received message is valid when the label code of the received message matches the label code corresponding to the current flight phase.

Optionally, a non-transitory computer-readable medium, storing a set of instructions, executable by a processor, to perform a method, is provided. The method may comprise accessing a message that was received at a transmitting line replaceable unit (TLRU); comparing a first portion of the received message with a corresponding portion of an expected message; and determining whether the received message is valid based on the comparing of the first portion of the received message with the corresponding portion of the expected message.

The features, functions, and advantages that have been discussed can be achieved independently in various implementations or may be combined in yet other implementations further details of which can be seen with reference to the following description and drawings.

BRIEF DESCRIPTION OF THE DRAWINGS

The accompanying drawings, which are incorporated in and constitute a part of this specification, illustrate the present teachings and together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to examples of the present teachings which are illustrated in the accompanying drawings. Wherever possible, the same reference numbers will be used throughout the drawings to refer to the same or like parts.

In order to address the increased threat of cyber attacks in computing systems on aircraft due to the introduction of additional methods of communication between LRUs, the present teachings relate to systems, methods, computer-readable media storing instructions, executable by a processor, to perform methods, and apparatus to monitor messages that are received in order to determine if one or more of the messages are valid messages or if the messages are corrupted by providing a threat, by including malware, or are otherwise invalid.

If it is determined that one or more messages are not valid, and are corrupted in some manner, an alert may be provided. The alert may be in the form of a visual indication on an instrument panel. For example, the visual alert may be in the form of an illumination of a portion of a display panel, i.e., a border, a background, etc. An alert may further be in the form of removal of a portion or all of a set of data that is displayed on an instrument in the display panel. The type of alert may be based on a threat level that may be based on a determination of how corrupted one or more messages are.

The examples provided herein are made with reference to Aeronautical Radio Inc. (ARINC) protocols, specifically, ARINC A429 protocol. However, the methods discussed herein may be applied to other aeronautic communication protocols including ARINC A422, A615a, A717, among others.

FIGS. 1-8 and the narrative below present a description of the present teachings. It will be understood that the figures represent generalized schematic illustrations where other structures may be added and existing structures may be removed or modified.

Figure 1:
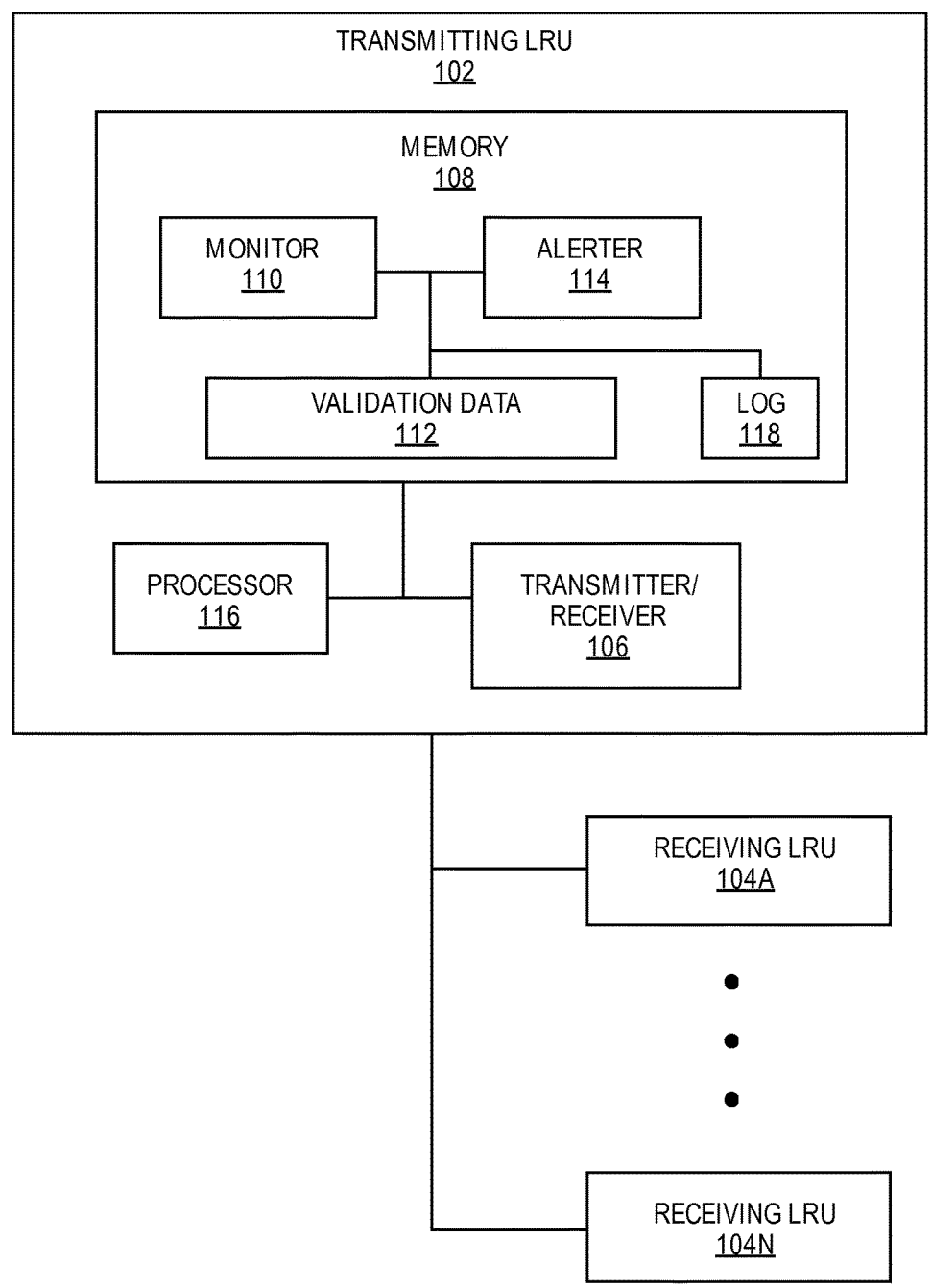
FIG. 1 depicts an example system environment in which principles of the present disclosure may be implemented.

FIG. 1 is an example depiction of a system environment 100 in accordance with the present disclosure. System environment includes a TLRU 102 and a plurality of RLRUs 104a to 104n, where n is an integer greater than 0.

TLRU 102 may include a transmitter/receiver 106 that is configured to receive messages from remote devices and is further configured to transmit the received messages to RLRUs 104a to 104n via a receive bus and a transmit bus, respectively.

TLRU 102 may further include a memory 108 that is configured to store software applications and modules as described herein where the applications may be implemented as either software, firmware and/or hardware applications and may be implemented as a set of computer or machine-readable instructions stored in any type of non-transitory computer-readable or machine-readable storage medium or other storage device. Some non-limiting examples of non-transitory computer-readable mediums may be embodied using any currently known media such as magnetic or optical storage media including removable media such as floppy disks, compact discs, digital video discs, flash memory, hard disk drives, etc. In addition, the storage device(s) as discussed herein may comprise a combination of non-transitory, volatile or nonvolatile memory such as random access memory (RAM) or read only memory (ROM). One or more storage devices has stored thereon instructions that may be executed by the one or more processors, such that the processor(s) implement the functionality described herein. In addition, or alternatively, some or all of the software-implemented functionality of the processor(s) may be implemented using firmware and/or hardware devices such as application specific integrated circuits (ASICs), programmable logic arrays, state machines, etc.

The memory 108 may store a monitor 110 that is configured to monitor messages that are received at the TLRU 102 by performing one or more processes or methods as more fully discussed herein in order to determine if the received messages are valid messages or are corrupted. Although FIG. 1 depicts the monitor 110 as being included in the TLRU 102, optionally, the monitor 1110 may be external from the TLRU 102. Further, although FIG. 1 depicts the monitor 110 as being implemented as software or firmware, optionally, the monitor 110 may be implemented solely in hardware.

The memory 108 may further store validation data 112, where the validation data 112 includes one or more sets of expected messages. Expected messages may be example valid messages that are expected to be received at the TLRU 102. Expected messages may be messages that are expected to be received during the usual operation of an aircraft and may include on or more sets of messages that are valid messages in a correct format and do not include corrupted data. Expected messages may be compared to received messages by the monitor 110 in order to determine if the received messages are valid messages or are corrupted. The monitor 110 may access the validation data 112 in order to determine if received messages are valid messages or are corrupted, as more fully discussed below.

The memory 108 further includes an alerter 114. The alerter 114 may receive instructions from the monitor 110 and provide an alert if one or more messages is determined to be corrupted. The alerter 114 may issue an alert based on the instructions received from the monitor 110. The alerts that are issued by the alerter 114, as more fully discussed below, may include illuminating or more areas of an instrument panel in an aircraft, for example, a border of an instrument display on the instrument panel, or other areas on an instrument display, removing at least a portion of data from an instrument panel, etc.

TLRU 102 further includes a processor 116 and may be implemented as one or more processors in communication with one or more storage devices, shown or not shown, including memory 108. The processor(s) may comprise a microprocessor, microcontroller, digital signal processor, co-processor or other similar devices known to those having ordinary skill in the art.

TLRU 102 may further include a log 118, stored in memory 108, that logs information related to received messages and information generated by monitor 110, including information identifying a received message, whether a received message was valid, a counter value, as more fully discussed below, an alert that was generated, etc.

Optionally, while FIG. 1 depicts the monitor 110 residing at TLRU 102, the system, instead, may be a distributed system where one or more RLRUs 104a through 104n include a monitor to perform part of the monitoring process. The monitors at the RLRUs may be in the form of software or hardware and may be implemented as agents that communicate with monitor 110 in order to determine whether a received message is a valid message.

Figure 2:
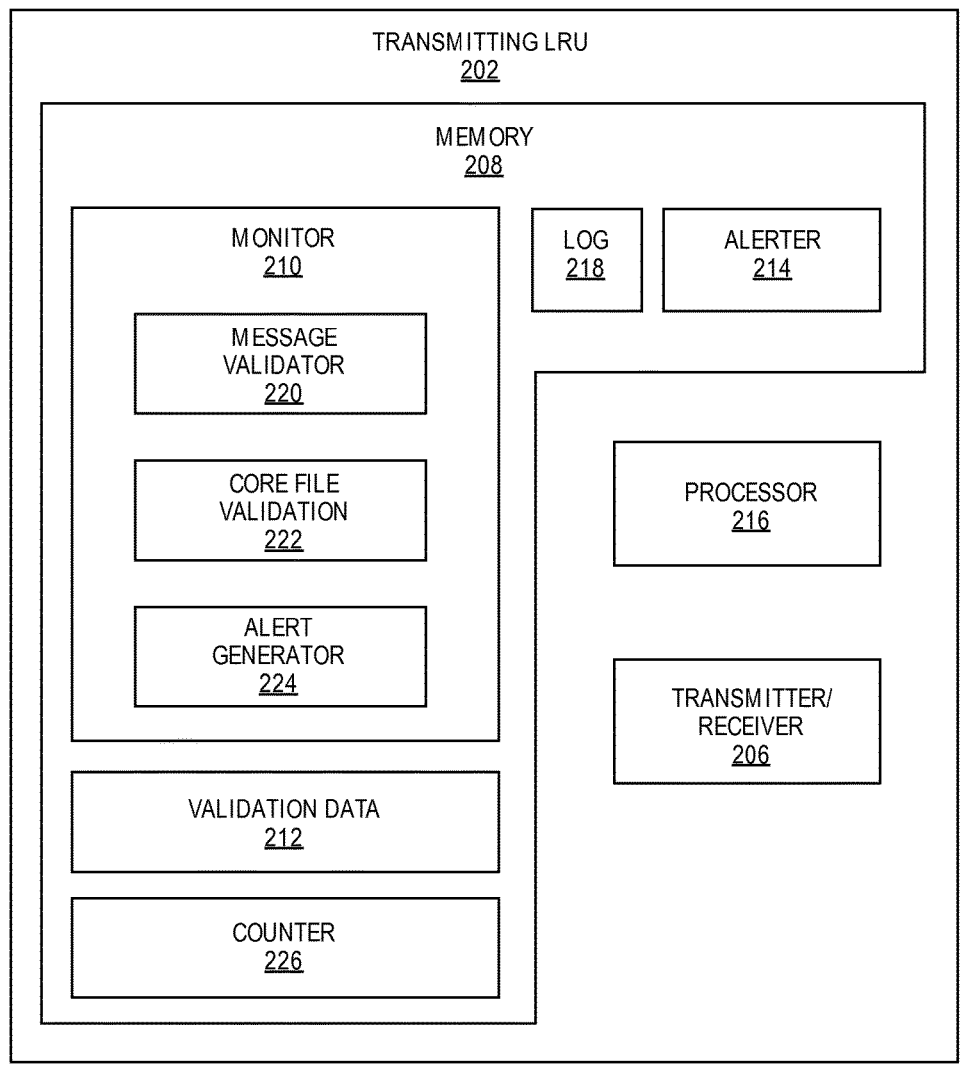
FIG. 2 depicts an example diagram of components of the TLRU, in accordance with the present disclosure.

FIG. 2 depicts an example diagram of components of a TLRU 202, in accordance with principles of the present disclosure. As shown in FIG. 2, TLRU 202 includes a memory 208 including a monitor 210, validation data 212, and a counter 22. TLRU 202 further includes an alerter 214, a processor 216, a log 218, and a transmitter/receiver 206. The properties of the elements of FIG. 2 are the same as the properties of the similar elements depicted in FIG. 1, except where noted below.

The monitor 210 includes a message validator 220. Message validator 220 accesses a message that has been received at the transmitter/receiver 206 and determines whether the received message is valid or corrupted by accessing an expected message from the validation data 112, shown in FIG. 1, and comparing the expected message to the received message. If, based on the comparison, it is determined that data in the received message is different than the data that is in the expected message, based on the comparison, then the alert generator 224 may generate and request the alerter 214 to issue an alert, as more fully discussed below.

Figure 3:
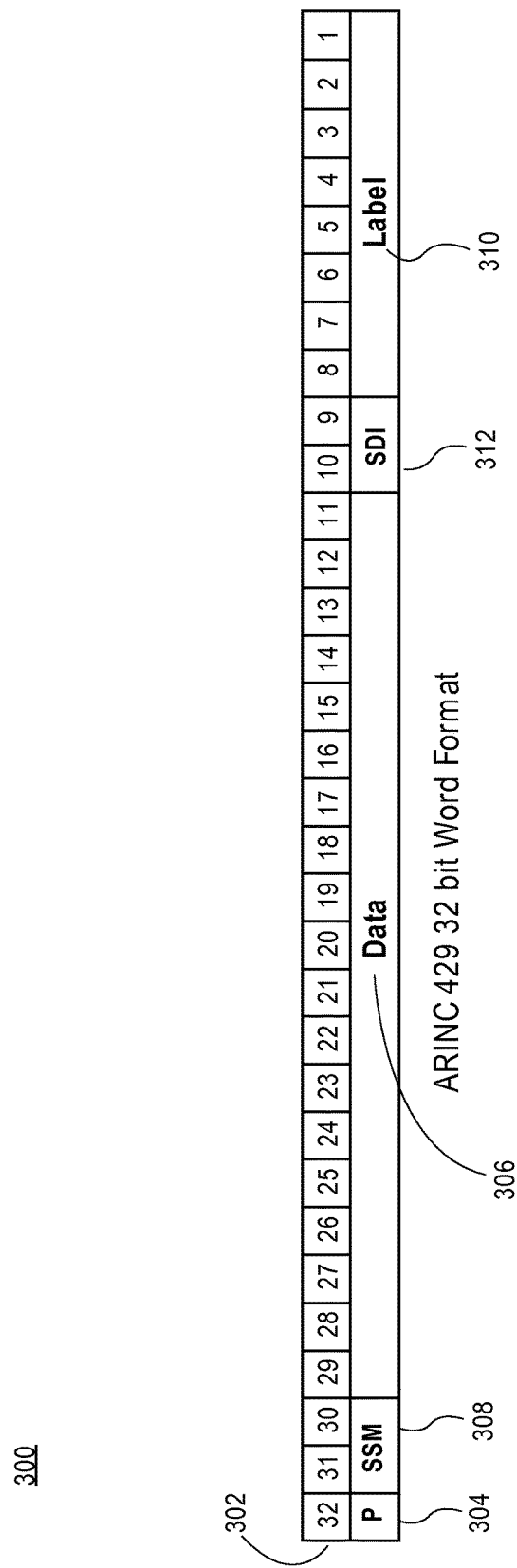
FIG. 3 depicts an example message format, in accordance with the principles of the present disclosure.

FIG. 3 depicts an example message format of an expected message and a message that may be received at TLRU 102, in accordance with the principles of the present disclosure. As shown in FIG. 3, a message 300 may be received at TLRU 202. The message 300 depicted in FIG. 3 may have a format of a message that is communicated via ARINC 429 communication protocol and may include a plurality of bits 302, namely 31 bits. The message 300 may be broken up into a plurality of portions including a parity portion 304, a data portion 306, a sign/status matrix (SSM) portion 308, and a label portion 310.

The parity portion 304 includes a parity bit, namely bit 30, which is used as an error check to ensure accurate data reception. Parity bit portion 304 is designated the most significant bit in the word string. The processes discussed herein may not need to compare the parity portion 304 of the received message with the parity portion 304 of an expected message, thereby reducing the amount of processing that may be performed during the comparison.

The sign/status matrix (SSM) portion 308 includes, in this example, two bits, namely bits 31 and 30, which indicate the type of data that is being transmitted. The sign/status matrix (SSM) portion 308 can be used to indicate a sign or direction of the message data, or report source equipment operating status and is dependent on the data type. The processes discussed herein may not need to compare the sign/status matrix (SSM) portion 308 of the received message with the sign/status matrix (SSM) portion 308 of an expected message, thereby reducing the amount of processing that may be performed during the comparison.

The data portion 306 of the message 300 includes 21 bits, namely bits 22 through 29, which contain the message's data information. This data information may include instructions to be performed by one or more of RLRU 104a to RLRU 104n. As more fully discussed below, the processes discussed herein compare the data portion 306 of a received message with the data portion 306 of an expected message in order to determine if the message includes corrupted data.

The label portion 310 of the message 300 includes 8 bits, namely bits 1 through 8. The label may be used to identify the message's data type, for example, binary, binary coded decimal, discrete, data, maintenance data and acknowledgement, Williamsburg/Buckhorn protocol, etc., and may contain instructions or data reporting information. Labels may further be refined by utilizing one or more bits as an equipment identifier to identify the bus transmission source. For example, binary label "102" indicates an instruction for a selected altitude. As more fully discussed below, the processes discussed herein compare the label portion 310 of a received message with the label portion 310 of an expected message in order to determine if the message includes corrupted data.

The source destination identifier (SDI) 312 can be used to identify which source is transmitting the data or by multiple receivers to identify which receiver the data is meant for. The processes discussed herein may not need to compare the source destination identifier (SDI) portion 312 of the received message with the source destination identifier (SDI) portion 312 of an expected message, thereby reducing the amount of processing that may be performed during the comparison.

Optionally, the label may be used to determine if the message is a message that should be received during a particular phase of flight. A flight of an aircraft has different phases. During each of these phases of flight, certain instructions regarding operation of the aircraft are expected to be received. Each of these phases of flight have a code associated therewith.

For example, the following represents an example set of flight phases and codes associated with each flight phase:

| Code | Flight Phase |
|---|---|
| 1 | Doors Locked |
| 2 | Engine Start |
| 3 | Parking Break Released |
| 4 | Taxi |
| 5 | Take Off |
| 6 | Climb |
| 7 | Cruise |
| 8 | Top of Descent |
| 9 | Landing Gear Down |
| 10 | Flare |
| 11 | Weight on Wheels |
| 12 | Deploy Spoilers |
| 13 | Thrust Reversers |
| 14 | Gate |
| 15 | Parking Break |
| 16 | Auxiliary Power Unit Start or Ground Power |
| 17 | Engines Off |

The label of a received message includes the code of the phase of flight that the message pertains to. Messages are expected to be received at the TLRU 202 during particular flight phases.

The label portion 310 may include a code that identifies a phase of flight that the message relates to. The code in the label portion 310 may be compared with a code associated with a current phase of flight, for example, the phase of the flight that the aircraft is currently in, in order to determine if the received message corresponds to an expected message that should be received during the current phase of flight. If the received message is a message that does not correspond to a current phase of flight, then the message may be considered to be corrupted, may be stored, may not be transmitted to a RLRU, an alert may be generated, etc. If, after comparing the code stored in the label with the current phase of flight, the received message is a message that corresponds to the current phase of flight, then further processing as discussed more fully below, may be performed to determine if the message is a corrupted message.

For example, the monitor 210 may determine a current flight phase. The monitor 210 may further analyze the received message in order to determine a label code in a label portion of the received message. The monitor may then compare the label code in the label portion 310 of the received message with a label code corresponding to the current flight phase of the aircraft. The monitor 210 may determine that the received message is valid when the label in the label portion of the received message matches the label code corresponding to the current flight phase. If the label code in the label portion of the received message does not match a label code in the current flight phase of the aircraft, the monitor may, for example, process the message as discussed below, log the message without transmitting the message to any RLRU, etc.

Optionally, the message 300 may be of a different format that corresponds to a different communication protocol, the portions of the message may be in a different order, and/or the message may include additional or different portions. However, the processes and methods disclosed herein may be applied to any of these types of messages.

Figure 4:
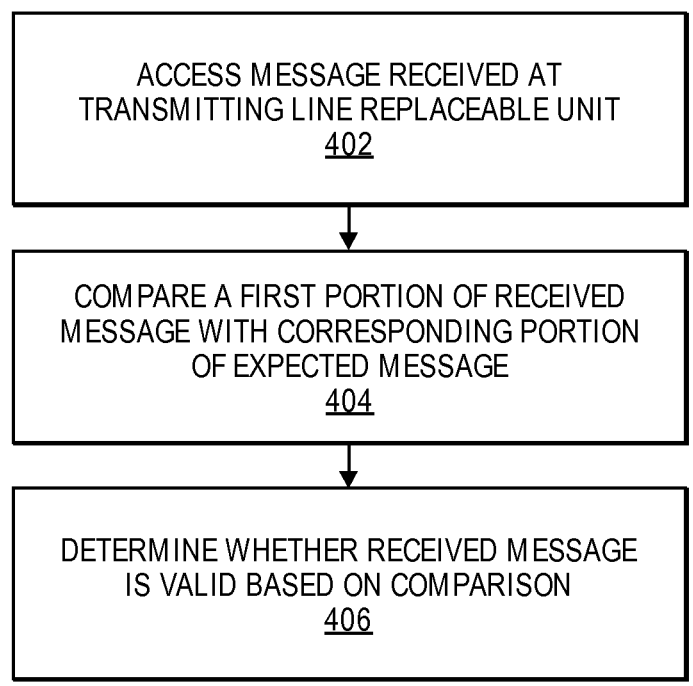
FIG. 4 depicts an example process for determining whether the received message is a valid message, in accordance with the principles of the present disclosure.

FIG. 4 depicts an example process 400 for determining whether the received message is a valid message. As shown in FIG. 4, a message that is received at a TLRU is accessed by the monitor, for example, monitor 210 (402). An expected message that corresponds to the received message may be selected and accessed from validation data 212. The expected message may correspond to the received message in that the expected message has the same label information as the received message. The message may be received via a receive bus at the TLRU.

A first portion of the received message may be compared with the corresponding portion of the expected message (404). For example, the data portion 306 of the received message may be compared with the data portion 306 of the selected expected message. This comparison may be, for example, a bit-by-bit comparison of the respective data portions of the received message and the selected expected message, as more fully discussed below.

A determination may then be made as to whether the received message is a valid message based on the comparison of the portion of the received message with the corresponding portion of the selected expected message (406). For example, if one or more bits of the bit-by-bit comparison do not match, then it may be determined that the message is not a valid message. Optionally, a counter 226 (see FIG. 2) may be updated by incrementing a counter value when the bit-by-bit comparison reveals that a bit in the received message does not match the corresponding bit in the selected expected message. After the comparison is completed, a value of the counter 226 may be determined and compared to one or more predetermined threshold values. If the value of the value of the counter meets or exceeds one or more of the predetermined threshold values, the monitor 210, via alert generator 224, may instruct the alerter 214 to issue an alert. The type of alert may be selected based on which of the one or more threshold values that the value of the counter 226 met or exceeded. The one or more predetermined threshold values may be preset manually, via a user interface (not shown), by an operator and stored in memory 208. If it is determined that the received message is a valid message, the received message may be transmitted, via a transmit bus at the TLRU, to a LRU to perform the instruction included in the received message.

Figure 5:
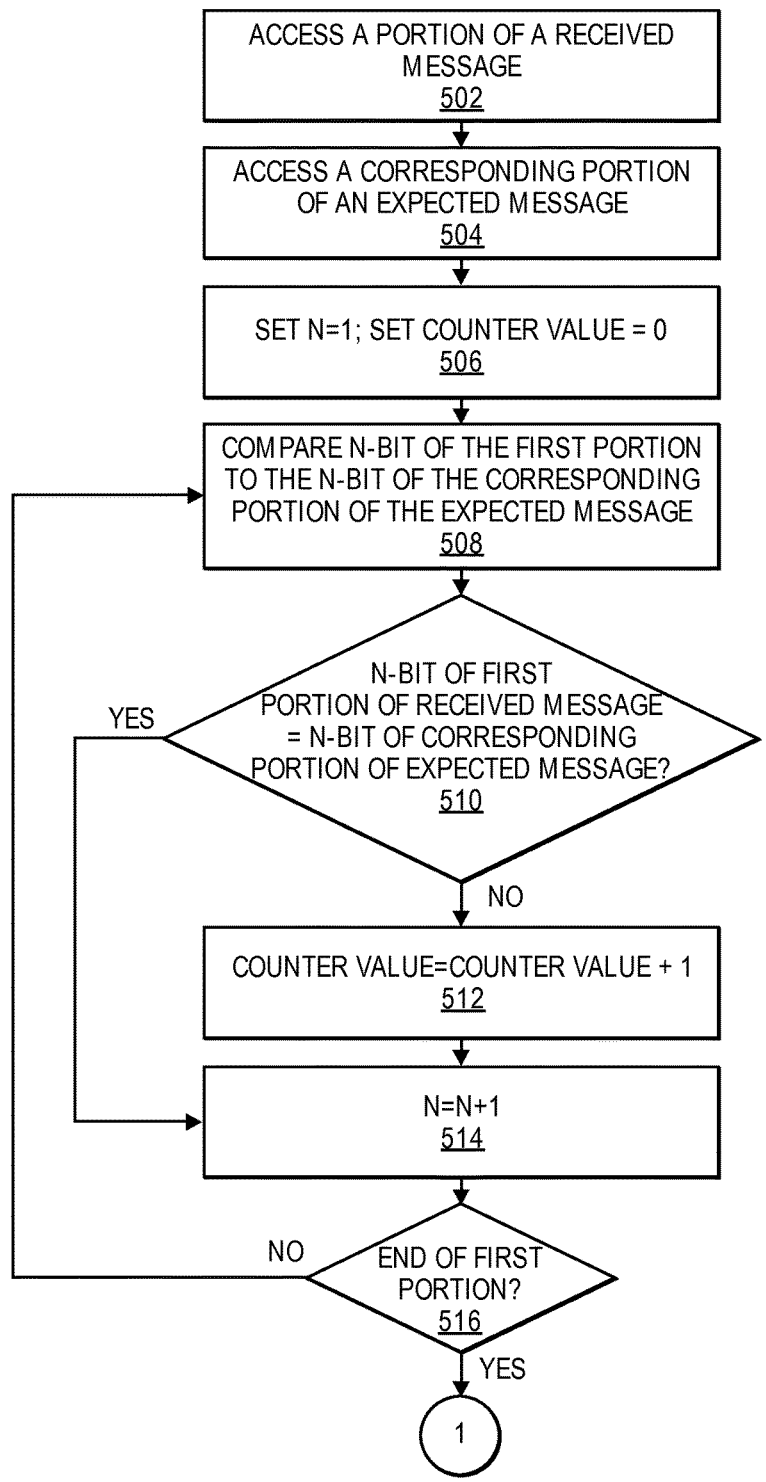
FIG. 5 depicts an example process for determining whether a received message is a valid message, according to principles of the present disclosure.

FIG. 5 depicts an example process 500 for determining whether a received message is a valid message based on a comparison of at least a portion of a received message to a selected expected message, according to principles of the present disclosure. As shown in FIG. 5, a portion of a received message is accessed (502). A corresponding portion of an expected message is accessed (504). Each of the accessed portions of the received message and the expected message has a same number of bits N, where N is an integer between 1 and x+1, x being the number of bits in the portion being compared. N is set to 1, and a counter value is set to 0 (506). The counter value represents the number of bits that do not match during the comparison of the bits in the portion of the received message with the bits in the portion of the expected message.

The N bit of the first portion of the received message is compared to the N bit of the corresponding portion of the expected message (508). A determination is made as to whether the N bit of the first portion of the received bit equals the N bit of the corresponding portion of the expected message (510). If the N bit of the first portion of the received bit does not equal the N bit of the corresponding portion of the expected message (510, NO), then the counter value is updated by incrementing the value of the counter by 1, such that the counter value=counter value+1 (512). The value N is then increased by 1 such that N=N+1 (514).

If the N bit of the first portion of the received bit equals the N bit of the corresponding portion of the expected message (510, YES), processing proceeds to 514 where the value N is then increased by 1 such that N=N+1.

A determination is made as to whether N equals x+1 such that the end of the portion has been reached and all of the bits in the portion have been compared (516). If the end of the portion has not been reached (516, NO), then processing proceeds to 508 to compare additional bits. If the end of the portion has been reached (516, YES), then processing may proceed to the process depicted in FIG. 6.

Optionally, if there is only one predetermined threshold value, the counter value may be compared with the counter value of the predetermined threshold value. If the counter value meets or exceeds the predetermined threshold value, then it may be determined that the message is not a valid message and an alert may be generated. For example, the monitor 210, via alert generator 224, may generate an instruction to the alerter 214 to issue an alert, for example, illuminate a border of a flight deck instrument on a display panel, illuminate a light on a display, issue an audible alert, flash a light, etc.

Figure 6:
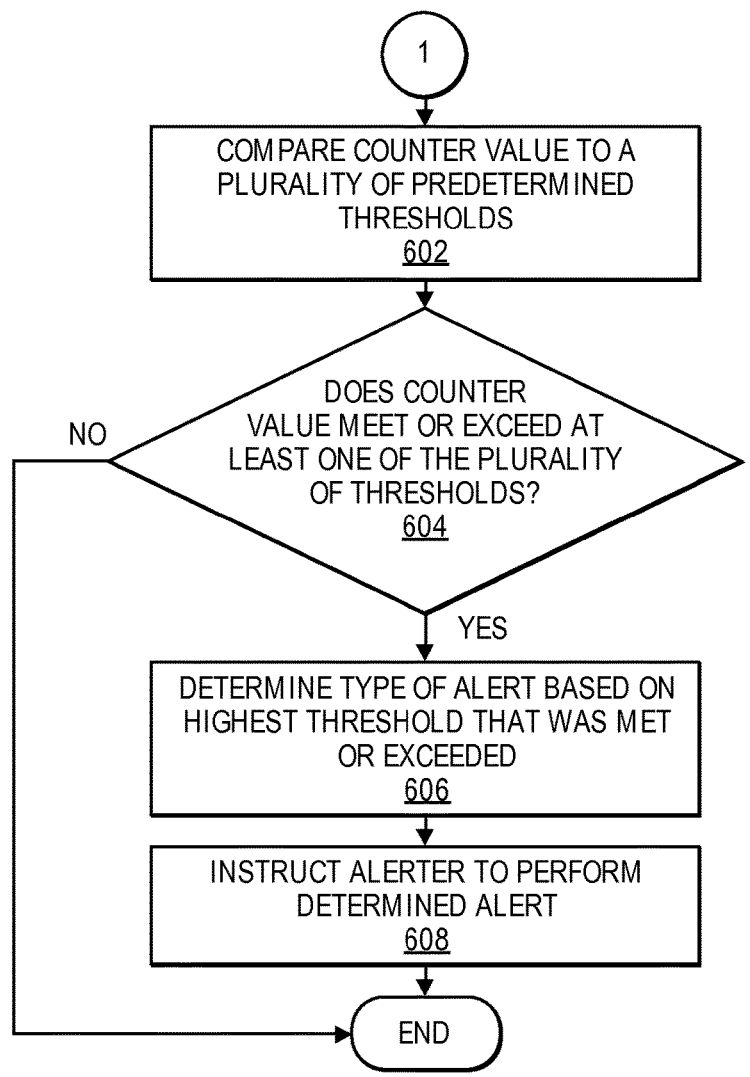
FIG. 6 depicts an example process 600 for issuing an alert, according to principles of the present disclosure.

FIG. 6 depicts an example process 600 for issuing an alert, according to principles of the present disclosure. As shown in FIG. 6, the value of the counter resulting from the process discussed in FIG. 5 is compared to a plurality of predetermined threshold values (602). A determination is made as to whether the value of the counter met or exceeded at least one of the plurality of predetermined threshold values (604). If the value of the counter does not meet or exceed at least one of the plurality of threshold values (604, NO), then processing ends and it is determined that the received message is a valid message. However, if the value of the counter meets or exceeds at least one of the plurality of predetermined threshold values (604, YES), then a type of alert to be generated is determined based on a highest one of the predetermined threshold values that was met or exceeded (606). An instruction is issued to the alerter to perform the determined alert (608).

For example, the monitor 210 may generate an instruction to the alerter 214 to issue an alert, for example, illuminate a border of a flight deck instrument on a display panel when the counter value exceeds a certain threshold value of the plurality of threshold values, where different colors are associated with different predetermined threshold values, illuminate a light on a display when the counter value exceeds a particular predetermined; issue an audible alert, flash a light, etc. Each of the predetermined threshold values may have associated therewith a type of alert to be generated and stored in memory 208. After performing the process depicted in FIGS. 5 and 6, the monitor 210 may access memory 208 and select an alert to be issued based on the highest predetermined threshold value that was met or exceeded by the counter value. The monitor 210 may the issue an instruction to the alerter based on the type of alert that was accessed from memory 208.

By providing a plurality of predetermined threshold values, an alert may selected based on the number of bits that do not match during the comparison of the portion of the received message with the portion of the corresponding message. This provides an opportunity to provide an alert based on a level of a threat of the message, where the higher the threshold value that was met or exceeded, the higher the threat level of the received message. This may be communicated by the alerter. For example, where the alert is illumination of an instrument on an instrument panel, if a lower threshold value is the highest threshold value that was met, the instrument may by illuminated by, for example, a color such as yellow, orange, etc., indicating a lower threat level. However the highest threshold value is met, then the instrument on the instrument panel may be illuminated with a color, for example, red, indicating a high threat level.

Figure 7:
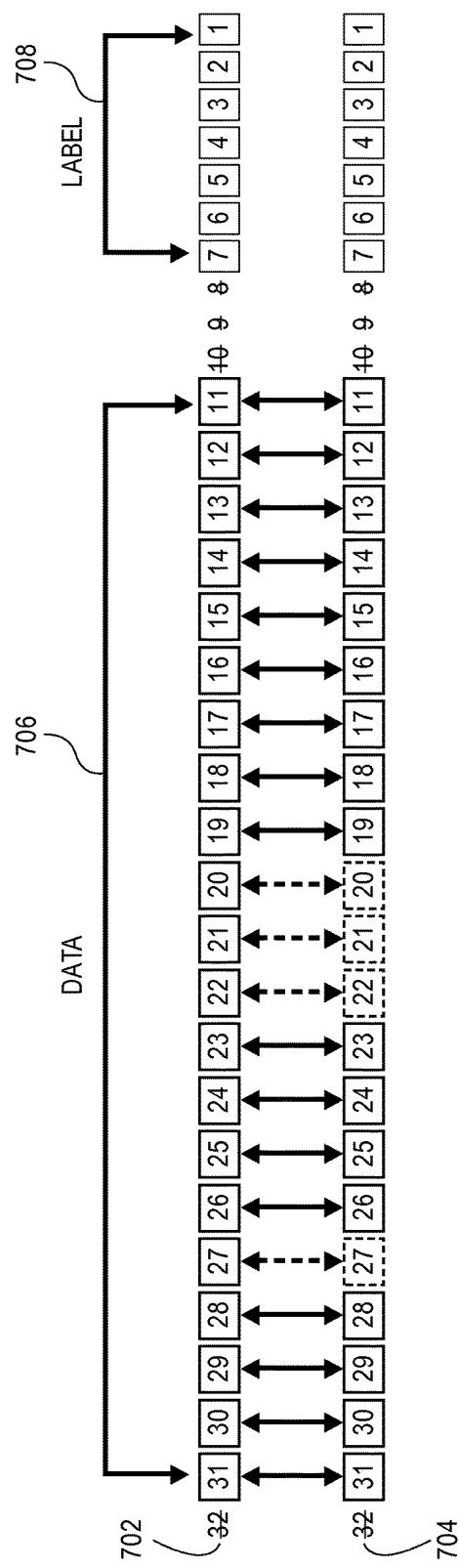
FIG. 7 depicts an example comparison of a portion of a received message with a corresponding portion of an expected message, according to principles of the present disclosure.

FIG. 7 depicts a specific example comparison of a portion of a received message with a corresponding portion of an expected message, according to principles of the present disclosure. As shown in FIG. 7, an expected message 702 and a received message 704 is provided. As discussed above, the expected message 702 may be selected based on the information included in label portion 708. The data portion 706 of the expected message is compared with the data portion 706 of the received message. Specifically, a bit-by-bit comparison is performed for each bit in the data portion 706 of the expected message and the received message. As can be seen in FIG. 7, bits 20, 21, 22, and 27 are identified by the dotted arrows as not matching during the bit-by-bit comparison. During the comparison process the counter value is updated such that after the comparison process is completed, the counter value is equal to 4. The counter value of 4 may be compared to a plurality of predetermined threshold values. For example, if the predetermined threshold values were 3, 5 and 8, since the counter value exceeds the first predetermined threshold value of 3, but does not exceed the predetermined threshold value of 5, the alert that is generated is based on the alert type that is associated with the first predetermined threshold value of 3.

In the example depicted in FIG. 7, bits 7, 9, 10, and 32, namely the sign/status matrix (SSM) bits 8, 9, and 10 and the parity bit 32 are not considered during the comparison process, thereby reducing processing resources and time.

Returning to FIG. 2, monitor 210 further includes core file validation 222. Core file validation 222 may determine whether files that are received at the TLRU 202 are valid files. This may be determined based on a hash value, date modification data of the received files, a standard modification time frame, etc.

The received files may include metadata that include a hash value and date modification data. The date modification data may indicate a date when the file was last modified.

A standard modification window, or time frame, may be stored in validation data 212 and may represent a time frame in which it is expected that received files may be updated. The standard modification window may be set by a user via a user interface, not shown.

The metadata may be used to determine whether the file was last updated on a date that is outside of the standard modification window. This may provide an indication whether the received file is a valid file.

Figure 8:
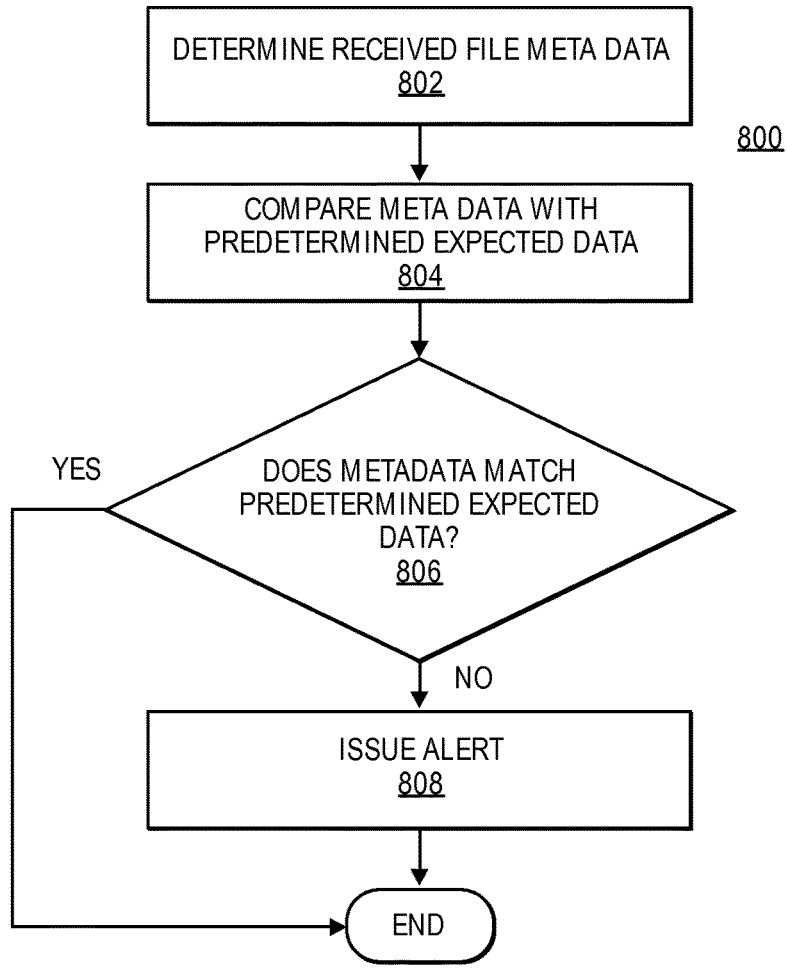
FIG. 8 depicts an example process for determined whether a core file is valid, according to principles of the present disclosure.

FIG. 8 depicts an example process 800 for determining whether a core file is valid, according to principles of the present disclosure. As shown in FIG. 8, metadata of the received file may be determined (802). The metadata that is determined may be one or more of a hash value, a date last modified, etc. The determined metadata may be compared with predetermined expected data (804). For example, the hash value of the received file may be compared with a stored hash value. According to another example, the date of the last modification of the file may be analyzed to determine if the date falls within the standard modification window.

A determination is made as to whether the metadata matches the predetermined expected data (806). For example, a determination is made as to whether the hash values match, if the date the file was last modified falls within the standard modification window, etc. If the metadata does not match the predetermined expected data (806, NO), then an alert may be issued (808). For example, the alert generator 224 may generate and instruct the alerter 214 to issue an alert, for example, illuminate a light on an instrument panel, issue an audible alert, flash a light, etc. Optionally, the core file validation 222 may not update the file, update the log 218 indicating the file was not updated, etc. If the metadata does match the predetermined expected data (806, YES), then processing ends as it is determined that the received file is a valid file and the core file validation 222 may update the file, transmit the file to one or more RLRUs, etc.

To the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials. The term "about" indicates that the value listed may be somewhat altered, as long as the alteration does not result in nonconformance of the process or structure to the present teachings.

The present disclosure provides specific implementations without being exhaustive, and other implementations of the present teachings may be apparent to those skilled in the art from consideration of the specification and practice of the disclosure herein. It is intended that the specification and examples be considered as exemplary only, with a true scope and spirit of the present teachings being indicated by the following claims.

The invention claimed is:

1. A system aboard an aircraft, comprising:
a first line replaceable unit (LRU) configured to receive Aeronautical Radio Inc. (ARINC) messages including instructions for other line replaceable units (LRUs);
a memory configured to store validation data including a set of expected ARINC messages; and
a monitor configured to monitor ARINC messages received at the first LRU and further configured to determine whether received ARINC messages are valid based on a comparison with at least a portion of the set of expected ARINC messages stored in the memory.

2. The system of claim 1, wherein the monitor is further configured to:
compare a first portion of a received message at the first LRU with a corresponding portion of an expected message in the set of expected messages; and
determine whether the received message is valid based on the comparing of the first portion of the received message with the corresponding portion of the expected message.

3. The system of claim 2, wherein comparing the message received at the first LRU includes:
perform a bit-by-bit comparison of the first portion of the received message with the corresponding portion of the expected message;
when the bit-by-bit comparison results in at least one non-match of compared bits, then for each non-match, update a counter;
compare a counter value with a plurality of predetermined threshold values; and
when the counter value meets or exceeds at least one of the predetermined threshold values, determine that the received message is not a valid message.

4. The system of claim 3, further comprising:
an alerter;
wherein the monitor is further configured to:
instruct the alerter to issue an alert when it is determined that the counter value exceeds at least one of the plurality of predetermined threshold values.

5. The system of claim 4, wherein the alerter illuminates a border of a flight deck instrument on a display panel when the counter value exceeds a first threshold of the plurality of threshold values.

6. The system of claim 5, wherein the border of the flight deck instrument is displayed in one of a plurality of colors based on the one of the plurality of threshold values that was met or exceeded thereby indicating a threat level.

7. The system of claim 4, wherein the alerter illuminates a light on a display when the counter value exceeds a second threshold of the plurality of threshold values.

8. The system of claim 1, wherein the memory is further configured to store flight phase information for each of a plurality of flight phases in association with a respective label code in the memory; and
wherein the monitor is further configured to:
determine a current flight phase;
determine a label code in a received ARINC message;
compare the label code of the received ARINC message with a label code corresponding to the current flight phase; and
determine that the received ARINC message is valid when the label code of the received ARINC message matches the label code corresponding to the current flight phase.

9. The system of claim 1, wherein the monitor is further configured to:
determine whether a core file associated with a received message has been altered based on at least one of a date indicating a last time the core file was written to, a date indicating when the core file was last modified, and an update schedule of the core file.

10. The system of claim 1, further comprising:
a plurality of other line replaceable units (LRUs) configured to receive messages from the first LRU that were received at the first LRU and to execute the instructions included in the received messages.

11. A method implemented aboard an aircraft, comprising:
accessing a received Aeronautical Radio Inc. (ARINC) message that was received at a first line replaceable unit (LRU) aboard the aircraft;
comparing a first portion of the received ARINC message with a corresponding portion of an expected ARINC message; and
determining whether the received ARINC message is valid based on the comparing the first portion of the received ARINC message with the corresponding portion of the expected ARINC message.

12. The method of claim 11, wherein comparing the first portion of the received ARINC message at the LRU includes:
performing a bit-by-bit comparison of the first portion of the received message with the corresponding portion of the expected message;
when a bit-by-bit comparison results in at least one non-match of respective bits, for each non-match, updating a counter;
comparing a counter value of the counter with a plurality of predetermined threshold values; and
when the counter value meets or exceeds at least one of the predetermined threshold values, determining that the received message is not a valid message.

13. The method of claim 12, the method further comprising:
instructing an alerter to issue an alert when it is determined that the counter value exceeds at least one of the plurality of predetermined threshold values.

14. The method of claim 13, wherein the alerter illuminates a border of a flight deck instrument on a display panel when the counter value exceeds a first threshold of the plurality of threshold values.

15. The method of claim 14, wherein the border of the flight deck instrument is displayed one of a plurality of colors based on the one of the plurality of threshold values that was met or exceeded indicating a threat level.

16. The method of claim 13, wherein the alerter illuminates a light on a display when the counter value exceeds a second threshold of the plurality of threshold value.

17. The method of claim 11, further comprising:
storing flight phase information for each of a plurality of flight phases in association with a respective label code in a memory;
determining a current flight phase;
determining a label code in a received ARINC message;
comparing the label code of the received ARINC message with a label code corresponding to the current flight phase; and
determining whether the received ARINC message is valid when the label code of the received message ARINC matches the label code corresponding to the current flight phase.

18. A non-transitory computer-readable medium, storing a set of instructions, executable by a processor, to perform a method aboard an aircraft, comprising:
accessing an Aeronautical Radio Inc. (ARINC) message that was received at a first line replaceable unit (LRU);
comparing a first portion of the received ARINC message with a corresponding portion of an expected ARINC message; and
determining whether the received ARINC message is valid based on the comparing of the first portion of the received ARINC message with the corresponding portion of the expected ARINC message.

* * * * *